United States Patent
Bahadure et al.

(10) Patent No.: US 12,536,075 B2
(45) Date of Patent: Jan. 27, 2026

(54) RECOVERY AWARE DATA MIGRATION IN DISTRIBUTED SYSTEMS

(71) Applicant: Dell Products L.P., Round Rock, TX (US)

(72) Inventors: Ashutosh Bahadure, Apex, NC (US); Srisailendra Yallapragada, Cupertino, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/811,175

(22) Filed: Jul. 7, 2022

(65) Prior Publication Data

US 2024/0012718 A1    Jan. 11, 2024

(51) Int. Cl.
| | |
|---|---|
| G06F 11/00 | (2006.01) |
| G06F 11/14 | (2006.01) |
| G06F 11/16 | (2006.01) |
| G06F 11/20 | (2006.01) |

(52) U.S. Cl.
CPC ...... *G06F 11/1469* (2013.01); *G06F 11/1464* (2013.01); *G06F 11/1658* (2013.01); *G06F 11/203* (2013.01); *G06F 11/2082* (2013.01); G06F 2201/84 (2013.01)

(58) Field of Classification Search
CPC ............ G06F 11/1469; G06F 11/1464; G06F 11/1658; G06F 11/2082; G06F 11/203; G06F 2201/84
See application file for complete search history.

(56) References Cited

U.S. PATENT DOCUMENTS

| | | | | |
|---|---|---|---|---|
| 7,308,545 | B1 * | 12/2007 | Kekre ................ | G06F 11/2097 711/161 |
| 7,437,601 | B1 * | 10/2008 | Manley .............. | G06F 11/1464 714/6.23 |
| 7,457,830 | B1 * | 11/2008 | Coulter .............. | G06F 11/1471 |
| 7,818,615 | B2 * | 10/2010 | Krajewski, III .... | G06F 11/1658 714/13 |
| 8,335,761 | B1 * | 12/2012 | Natanzon ........... | G06F 11/2058 707/626 |
| 8,655,848 | B1 * | 2/2014 | Leverett .............. | G06F 16/128 709/201 |
| 10,228,962 | B2 * | 3/2019 | Dornemann ........ | G06F 11/2097 |
| 11,409,700 | B2 * | 8/2022 | Ren .................... | G06F 11/3034 |
| 2005/0050115 | A1 * | 3/2005 | Kekre ................ | G06F 11/2071 |

(Continued)

FOREIGN PATENT DOCUMENTS

CN            109062735 A    *  12/2018   .......... G06F 11/1446

*Primary Examiner* — Elmira Mehrmanesh
(74) *Attorney, Agent, or Firm* — Workman Nydegger (57) ABSTRACT

Data protection aware data migration in distributed systems is disclosed. While actively migrating data from a source to a target, the process of protecting the data is performed with respect to a recovery system. Thus, data is replicated to both the target and the recovery system. During a final phase, synchronization data is sent to both the target and the recovery system. After transmitting the synchronization data, replication or migration then between the source and the target and between the source and the recovery system ceases. The target then synchronized with the recovery system based on the synchronization data and begins operation as a new source. The old source, from which the data was migrated to the new source, may be decommissioned.

16 Claims, 7 Drawing Sheets

(56) References Cited

U.S. PATENT DOCUMENTS

| | | | |
|---|---|---|---|
| 2005/0154847 A1* | 7/2005 | Trembecki | G06F 11/2058 |
| | | | 714/E11.105 |
| 2014/0040574 A1 | 2/2014 | Mcdowell et al. | |
| 2016/0026703 A1* | 1/2016 | Yadav | G06F 16/13 |
| | | | 707/613 |
| 2017/0185491 A1* | 6/2017 | Hajare | G06F 11/2097 |
| 2018/0246648 A1 | 8/2018 | Venkat et al. | |
| 2019/0377651 A1* | 12/2019 | McBride | G06F 11/2082 |
| 2019/0391740 A1* | 12/2019 | Cheng | G06F 3/065 |
| 2021/0073190 A1* | 3/2021 | Bedadala | G06F 11/1469 |
| 2022/0244876 A1* | 8/2022 | Abouelwafa | G06F 12/0871 |
| 2023/0205639 A1* | 6/2023 | Yadav | G06F 11/1446 |
| | | | 707/645 |

* cited by examiner

RECOVERY AWARE DATA MIGRATION IN DISTRIBUTED SYSTEMS

FIELD OF THE INVENTION

Embodiments of the present invention generally relate to data protection and data migration. More particularly, at least some embodiments of the invention relate to systems, hardware, software, computer-readable media, and methods for recovery aware data migration in distributed systems.

BACKGROUND

Data migration generally refers to the process of moving or copying data from one location to another location or from one system to another system. Data is often migrated from an on-premise storage system to a cloud-based storage system. Data can also be migrated intra-cloud or from one cloud provider to another cloud provider.

More specifically, migrating data may refer to the concept of moving production data from a source location to a destination location, which then becomes the source location. Once the migration is completed to the new source location, the old source location may be abandoned or decommissioned. Migration may occur for a variety of different reasons. For example, data may be migrated from older storage devices (e.g., end-of-life) to newer storage devices. Data may be migrated due to architectural changes or to account for a new system or application.

Whenever data is migrated from a source to a target, the data may be at risk at least because the data may not be protected. Migrating data, from a security or data protection viewpoint is difficult because data protection systems have difficulty in protecting data subject to migration.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection and/or data migration. More particularly, at least some embodiments of the invention relate to systems, hardware, software, computer-readable media, and methods protecting data before, during, and after data migration.

A distributed computing system can be defined and implemented in many different ways. By way of example, a distributed system may include nodes that are connected by a network connection. The nodes may be arranged in a peer-to-peer manner, in client/server relationships, clusters, and the like. In one example, a distributed system may refer to or include storage devices that are used to store data of an entity, of one or more applications, or the like. Each node of a distributed system may be associated with storage.

Figure 1:
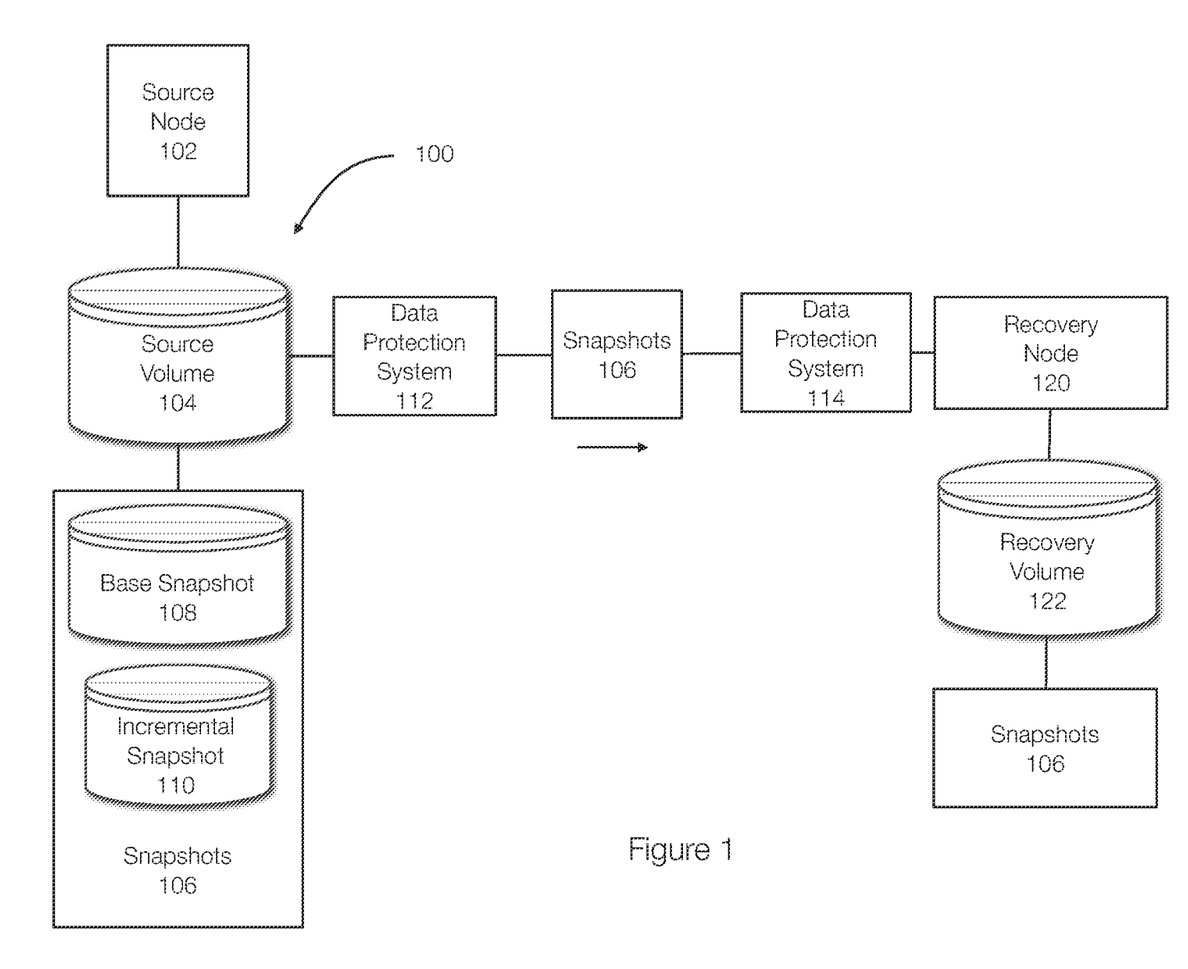
FIG. 1 discloses aspects of performing data protection operations including backup or snapshot operations.

FIG. 1 discloses aspects of a distributed system. FIG. 1 illustrates a node 102 that is associated with a source volume 104. The node 102 may be a server computer or other computing device. The node 102 may be a physical machine, a virtual machine, a container, or the like. The volume 104 may be a virtual volume, a logical device, a physical device or the like. Although a single node 102 and a single volume 104 are illustrated, a distributed system may include multiple nodes and multiple volumes. The various nodes may be arranged different configurations and/or may be remotely located from each other and accessible over a network. The nodes may be on-premise nodes, edge nodes, and/or cloud-based nodes. Each of the nodes may be associated with one or more volumes or other storage devices and storage configurations.

The volume 104 may store production data that is used by applications. A data protection system 112 may be configured to protect the system 100 or more specifically, the data stored on the source volume 104. In some examples, the data protection system 112 may protect an application as a whole rather than simply the production data itself.

The data protection system 112 is an appliance (virtual or physical) that is configured to protect data stored on the source volume 104. This may be achieved by generating backups of various kinds. By way of example only, backups generated by the data protection system 112 may include backups, snapshots, point in time (PiT) backups, replicated copies, journals, or the like. These backups may be full backups, incremental backups, snapshots, incremental snapshots, journaled backups, or the like.

For instance, the data protection system 112 may generate snapshots 106 of the node 102 or, more specifically, of the volume 104. The snapshots 106 may include a base snapshot 108 and incremental snapshots, represented by the incremental backup 110. The base snapshot 108 represents an initial copy of the data on the source volume 102. After the base snapshot 108 is taken, incremental snapshots 110 are performed. Each incremental snapshot may correspond to a short period of time and may include changes to the source volume 104 since a most recent or previous snapshot. The base snapshot 108 may be larger in size than the incremental snapshot 110.

The data protection system 112 may replicate or transmit the snapshots 106 to the recovery node 120. The snapshots 106 can be reconstituted (e.g., merged together, written) into the recovery volume 122. Thus, the recovery volume 122 is a copy of the source volume 104. In the event of failure or other issue regarding the source volume 104, the computing system 100 can resume operations using the recovery volume 122. In effect, the recovery node 120 and the recovery volume 122 can become the primary node and volume used for production data. The snapshots 106 may be used, in addition, to recover to different points in time.

The data protection system 112 can connect to the source volume 104 in different manners and the snapshots 106 can be transmitted to the recovery node 120 in different manners and paths. The snapshots 106 may be transmitted to the recovery node 110 through the source node 102 or through the data protection system 112. In one example, the recovery node 120 may also be associated with a data protection system 114 or appliance. Thus, the snapshots 106 are generated by the data protection system 112 and managed on the recovery side by the data protection system 114. The data protection system 112 and 114 may be part of a single data protection system.

Embodiments of the invention generally relate to migrating data from a source to a target. After migration, the target becomes the new source. The source and target may have different forms or configurations. When migrating data, the intent may be, by way of example, to move the production data to a new source node from a current or source node and then retire or decommission the original source node/volume.

Figure 2A:
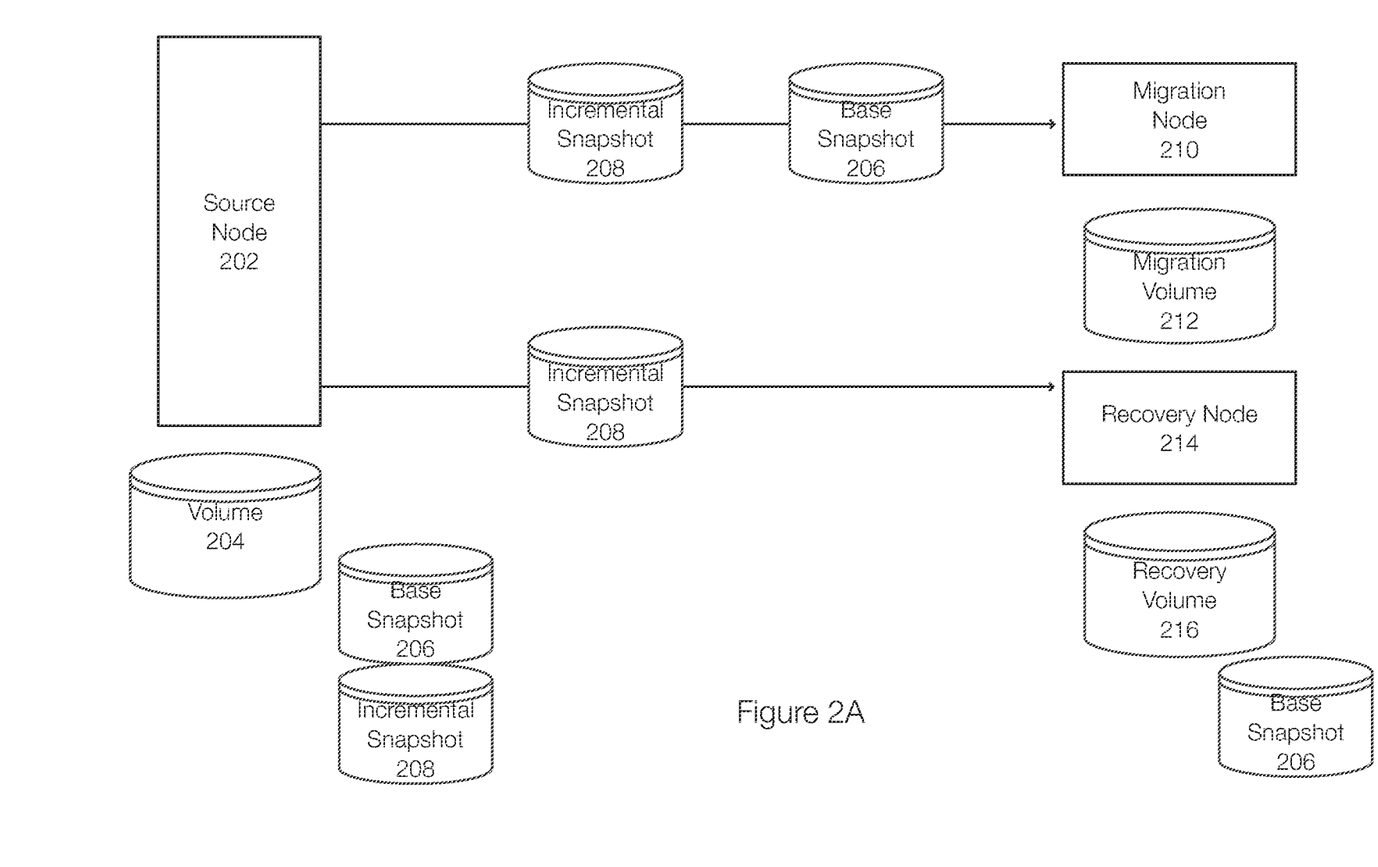
FIG. 2A discloses aspects of an active phase of migrating data from a source to a target.

FIG. 2A discloses aspects of migrating data from a source volume to a target or migration volume. FIG. 2A discloses aspects of data migration in an initial phase. More specifically, FIG. 2A discloses aspects of migrating data while ensuring that access to a recovery copy is available before migration, during migration, and after migration. The data stored in a volume 204 associated with a source node 202 is protected using snapshots such as the base snapshot 206 and the incremental snapshot 208 (the incremental snapshot 208 may represent multiple incremental snapshots). As illustrated in FIG. 2A, the recovery volume 216 may represent a copy of the volume 204 after snapshots have been applied. In this example, the base snapshot 206 has already been transmitted to the recovery node 214 and applied to the recovery volume 216. As previously stated, once a base snapshot has been replicated (e.g., transmitted and applied), only incremental snapshots are required. A user may, however, elect to send a new base snapshot at various times.

In this example, a user may decide to migrate the source node 202 to the migration node 210. This includes migrating the data on the volume 204 to the migration volume 212. This may be achieved by sending the snapshots 206 and 208. In particular, the base snapshot 206 is transmitted to the migration node 210 and applied to the migration volume 212. The incremental snapshot 208 is also transmitted to the migration node 212 and applied to the migration volume 212.

At the same time, the incremental snapshot 208 may be transmitted to the recovery node 214, stored and/or applied to the recovery volume 216.

In effect, once a decision is made to migrate a node to a new node, the data protection application may continue to operate with respect to the recovery node 214. The data protection system (or application) may also begin transmitting snapshots to the migration node 210.

Figure 2B:
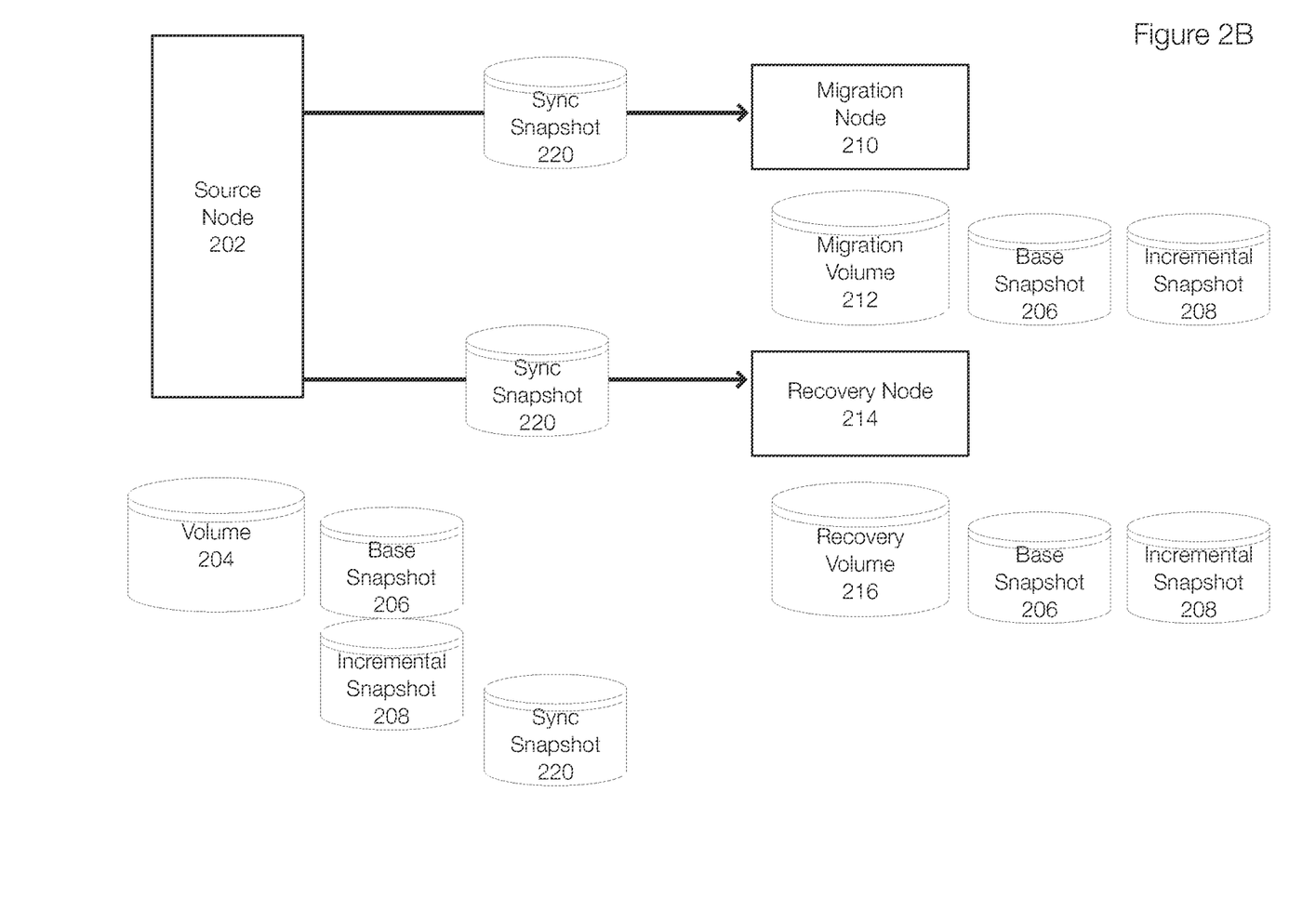
FIG. 2B discloses aspects of a final phase of migrating data from the source to the target.

FIG. 2B discloses additional aspects of data migration in a final phase. In the final phase, both the base snapshot 208 and the incremental snapshot 208 (which may represent multiple incremental snapshots) have been transmitted to the migration node 210 and/or applied to the migration volume 212. The data protection system has also replicated the base snapshot 206 and the incremental snapshot 208 to the recovery node 214.

Once the base snapshot 206 and the incremental snapshot 208 have been transmitted to the migration node 210 and the recovery node 214, a sync snapshot 220 is created at the source node 202 and transmitted to both the recovery node 214 and the migration node 210. At this state, once the sync snapshot 220 has been replicated to the migration node 210 and the recovery node 214, replication is stopped.

Stopping replication from the source node 202 ensures that, based on the sync snapshot 220, the source node 202, the migration node 210, and the recovery node 214 are synchronized after the synch snapshot 220, or other synchronization data, is applied to the migration volume 212 and the recovery volume 216.

Figure 2C:
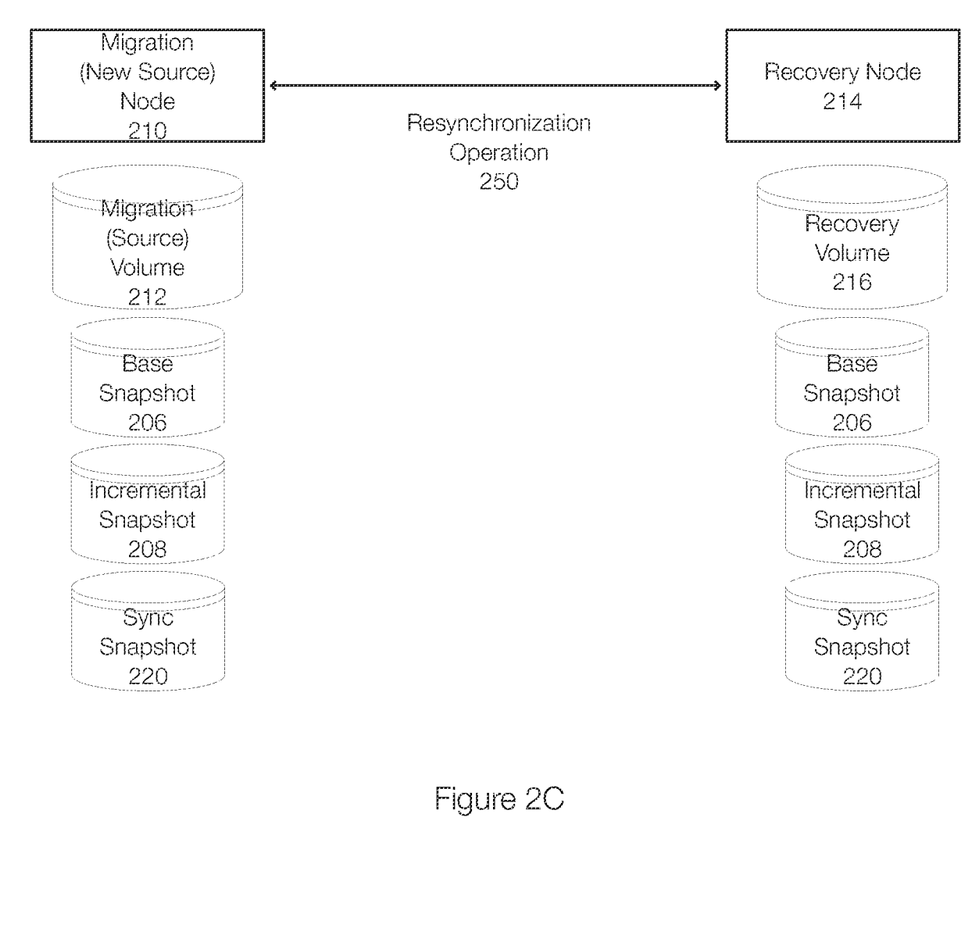
FIG. 2C discloses aspects of synchronizing the new source, which is the target to which data has been migrated, with a recovery system or node.

FIG. 2C discloses additional aspects of data migration. After the replication has stopped, a resynchronization operation 250 is performed between the migration node 210 and the recovery node 214. Due to the migration, the migration node 210 becomes the new source node or the source node 210 and the original source node 202 can be retired or decommissioned.

The resynchronization operation 250 is initiated between the migration node 210 and the recovery node 214. The resynchronization operation 250 may initiate a handshake operation such that the migration node 210 and the recovery node 214 can find the common sync snapshot 220. Once the migration node 210 and the recovery node 214 determine that they are synchronized with respect to the sync snapshot 220, the migration node 210 (which is now the source node) can replicate any changes to the migration (new source) volume 212 to the recovery node 214 and recovery volume 216.

Because the recovery volume 216 was kept synchronized during migration, the migration node 210 only needs to replicate data in an incremental fashion. For example, the migration node 210 (or the data protection system) may begin sending incremental snapshots. The first incremental snapshot may be changes since the sync snapshot 220. This ensures that the recovery volume 216 or the recovery node 214 is maintained before, during, and after data migration.

Embodiments of the invention ensure that the replication pair, which includes the migration node 210 and the recovery node 214, is established quickly and such that lags between the primary copy now on the migration (new source) volume 212 and the recovery volume 216 are avoided or reduced compared to where data protection operations are stalled during data migration. Embodiments of the invention may help avoid a full re-synchronization between the migration (new source) node 210 and the recovery node 214, which could take days for large storage units.

Figure 2D:
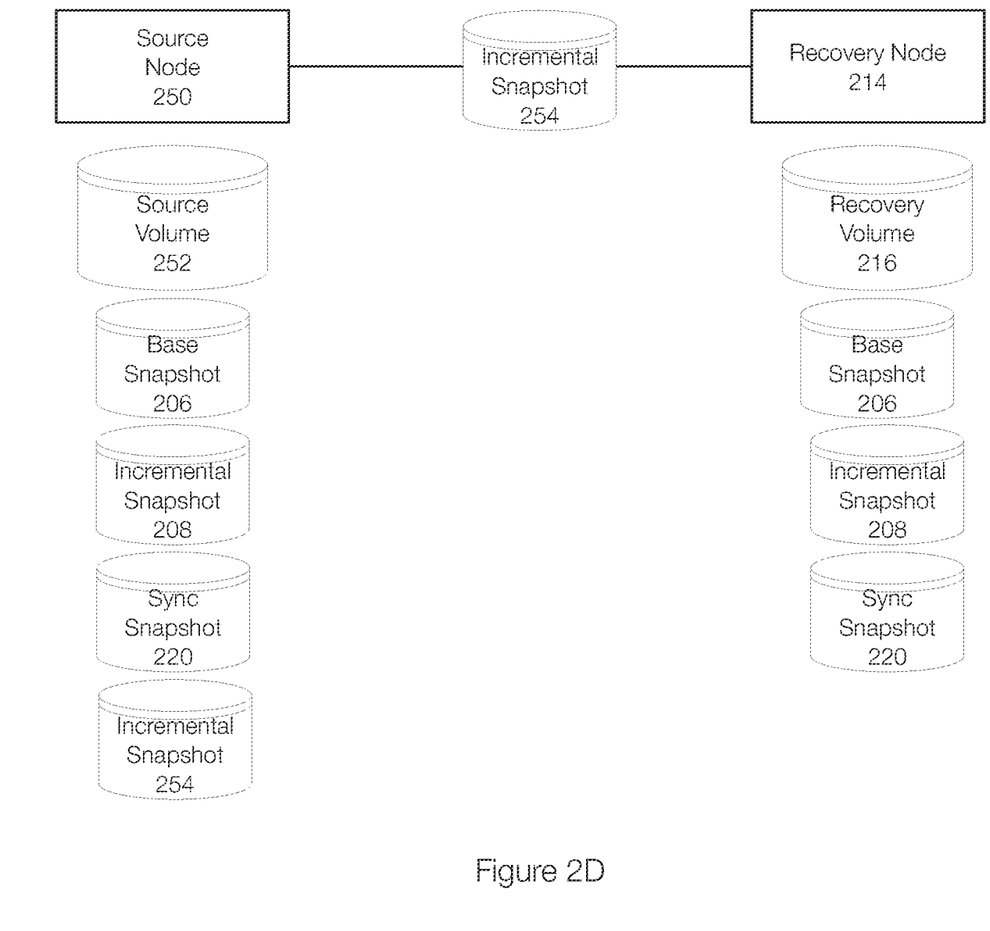
FIG. 2D discloses aspects of operating the source after data migration is completed and resuming data protection operations.

FIG. 2D discloses aspects of the system post-migration. In this example, the migration node 210 is now the source node 250 and the migration volume 212 is now the source volume 252. Migration and resynchronization have been completed and a new incremental snapshot 254 has been taken and is being transmitted to the recovery node 214 to be merged or added to the recovery volume 216. Thus, FIG. 2D illustrates replication for data protection purposes after migration from the source node 202 to a new source node 250 has been completed.

Figure 3:
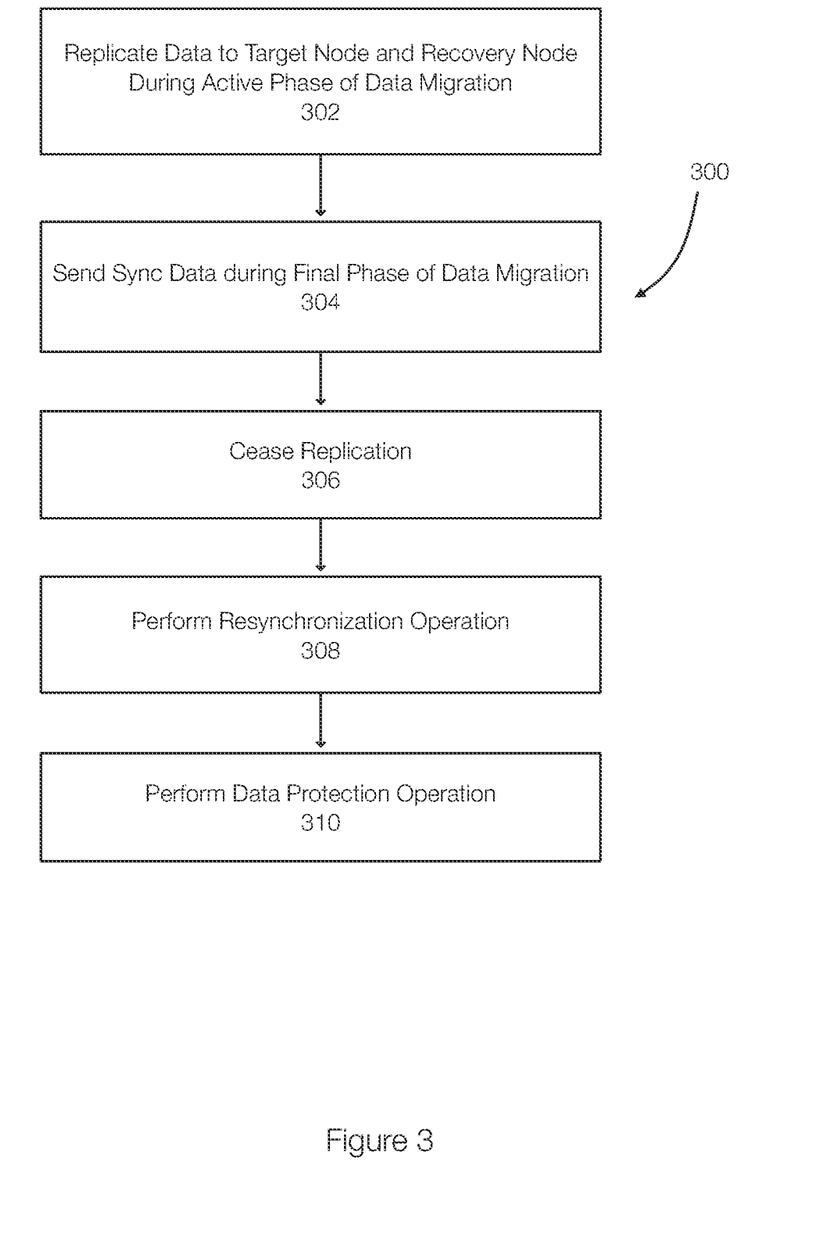
FIG. 3 discloses aspects of migrating data from a source to a target.

FIG. 3 discloses aspects of migrating data in a computing system. The method 300 essentially begins with an active phase of migrating data. During the active phase of data migration, data from the source node (or source volume) is replicated 302 to the migration node (or migration volume). At the same time, data is also replicated to the recovery node (or the recovery volume).

Replicating data to both the migration node and the recovery node ensures that data protection can resume quickly once the migration is completed.

During a final phase of migrating data, synchronization (sync) data (e.g., a sync snapshot) is generated at the source node and transmitted or sent 304 to both the migration node and the recovery node. Once the sync data is generated and transmitted, replication ceases 306 or is stopped at the original source node. More specifically, no additional data is transmitted to either the migration node or the recovery node after the sync data is generated and transmitted.

In some examples, new writes may be queued during the final phase of migration and then applied to the new source node.

Next, once both the recovery node and the migration node have incorporated the sync data, a synchronization operation is performed 308. The synchronization operation (or resynchronization operation) allows the new source node and the recovery node to ensure that they are synchronized with respect to the sync data.

Once the new source node and the recovery node confirm synchronization, data protection operations are performed 310. This may include sending snapshots or performing other data protection operations to protect the data on the source volume.

More generally, embodiments of the invention ensure that the recovery node is kept up to date with the migration node or during data migration. This ensures that, when migration is complete, the new source node can easily synchronize with the recovery node and resume normal operation, which may include data protection operations. This ensures that the recovery node is available and current before, during, and after migration.

Various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, backup operations, point in time backup operations, snapshot operations, recovery operations, replication operations, migration operations, decommission operations, recovery operations, or the like or combination thereof. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, DELL EMC RecoverPoint, and storage environments such as the Dell-EMC DataDomain storage environment. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, protecting, and creating, data. As such, a particular client may employ, or otherwise be associated with, one or more instances of each of one or more applications that perform such operations with respect to data. Such clients may comprise physical machines, containers, or virtual machines (VM).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: performing an active phase of a migration operation from a source node to a target node by: migrating the data at the source node to the target node, and protecting the data on the source node at a recovery node, performing a final phase of the migration operation by transferring synchronization data from the source node to both the target node and to the recovery node, resynchronizing the target node with the recovery node based on the synchronization data, wherein the target node becomes a new source node, and resuming normal operation of the new source node including data protection operations with the recovery node.

Embodiment 2. The method of embodiment 1, further comprising ceasing from transmitting data from the source node to the target node and ceasing from transmitting data from the source node to the recovery node after transmitting the synchronization data.

Embodiment 3. The method of embodiment 1 and/or 2, wherein migrating the data at the source node to the target node comprises migrating a base snapshot and one or more incremental snapshots to the target node.

Embodiment 4. The method of embodiment 1, 2, and/or 3, wherein protecting the data on the source node at the recovery node includes performing data protection operations.

Embodiment 5. The method of embodiment 1, 2, 3, and/or 4, wherein the data protection operations include snapshot operations.

Embodiment 6. The method of embodiment 1, 2, 3, 4, and/or 5, wherein the synchronization data comprises a synchronization snapshot.

Embodiment 7. The method of embodiment 1, 2, 3, 4, 5, and/or 6, wherein resynchronizing the target node with the recovery node includes ensuring that the target node and the recovery node include the synchronization data.

Embodiment 8. The method of embodiment 1, 2, 3, 4, 5, 6, and/or 7, wherein resuming normal operations includes generating incremental snapshots of the new source node that are transmitted to and applied at the recovery node.

Embodiment 9. The method of embodiment 1, 2, 3, 4, 5, 6, 7, and/or 8, further comprising decommissioning the source node after the migration is completed.

Embodiment 10. The method of embodiment 1, 2, 3, 4, 5, 6, 7, 8, and/or 9, further comprising enabling access to the recovery node before, during, and after migrating the source node to the target node, wherein the target node becomes the new source node.

Embodiment 11. A method for performing any of the operations, methods, or processes, or any portion of any of these, or any combination thereof, disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
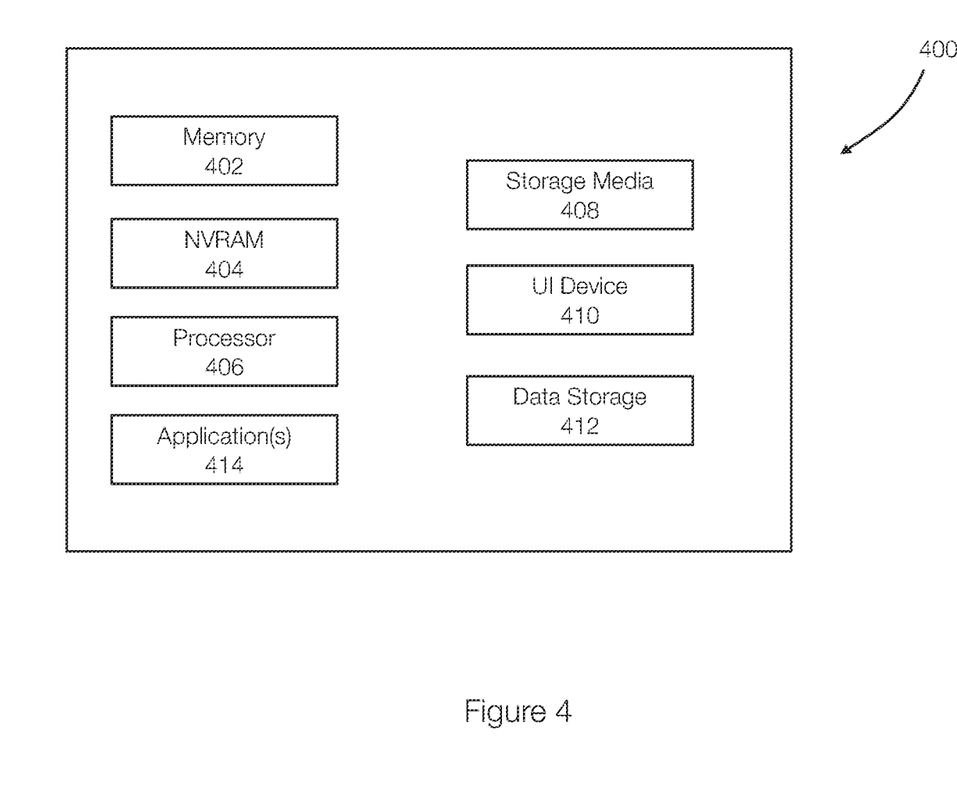
FIG. 4 discloses aspects of a computing device, a computing system, or a computing entity.

With reference briefly now to FIG. 4, any one or more of the entities disclosed, or implied, by the Figures, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid-state device (SSD) storage. As well, one or more applications 414 may be provided that comprise instructions executable by one or more hardware processors 406 to perform any of the operations, or portions thereof, disclosed herein. The device 400 may alternatively represent a virtual machine, a computing system including multiple devices or machines, or the like.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    performing an active phase of a migration operation from a source node to both a target node and a recovery node by:
        migrating data at the source node to the target node while continuing to protect the data of the source node at the recovery node;
    performing a final phase of the migration operation by generating synchronization data and transferring synchronization data from the source node to both the target node and the recovery node, wherein the target node and the recovery node apply the synchronization data independently and wherein data is stopped from being migrated to both the target node and the recovery node once the synchronization data is generated;
    queuing new writes to the source node during the final phase;
    ensuring, by the target node and the recovery node, that the target node and the recovery node are synchronized with respect to the synchronization data; wherein the target node becomes a new source node;
    decommissioning the source node after the migration is completed;
    applying the new writes to the new source node; and
    resuming normal operation of the new source node including data protection operations with the recovery node.

2. The method of claim 1, further comprising ceasing from transmitting data from the source node to the target node and to the recovery node after transmitting the synchronization data.

3. The method of claim 1, wherein migrating the data at the source node to the target node comprises migrating a base snapshot and one or more incremental snapshots to the target node.

4. The method of claim 1, wherein protecting the data on the source node at the recovery node includes performing data protection operations.

5. The method of claim 4, wherein the data protection operations include snapshot operations.

6. The method of claim 1, wherein the synchronization data comprises a synchronization snapshot.

7. The method of claim 1, wherein resuming normal operations includes generating incremental snapshots of the new source node that are transmitted to and applied at the recovery node.

8. The method of claim 1, further comprising enabling access to the recovery node before, during, and after migrating the source node to the target node, wherein the target node becomes the new source node.

9. A non-transitory storage medium having stored therein instructions that are executable by one or more hardware processors to perform operations comprising:
    performing an active phase of a migration operation from a source node to both a target node and a recovery node by:
        migrating data at the source node to the target node while continuing to protect the data of the source node at the recovery node;
    performing a final phase of the migration operation by generating synchronization data and transferring synchronization data from the source node to both the target node and the recovery node, wherein the target node and the recovery node apply the synchronization data independently and wherein migrating data to the target node and the recovery node is stopped once the synchronization data is generated;
    queuing new writes to the source node during the final phase;
    ensuring, by the target node and the recovery node, that the target node and the recovery node are synchronized with respect to the synchronization data; wherein the target node becomes a new source node;
    decommissioning the source node after the migration is completed;
    applying the new writes to the new source node; and
    resuming normal operation of the new source node including data protection operations with the recovery node.

10. The non-transitory storage medium of claim 9, further comprising ceasing from transmitting data from the source node to the target node and to the recovery node.

11. The non-transitory storage medium of claim 9, wherein migrating the data at the source node to the target node comprises migrating a base snapshot and one or more incremental snapshots to the target node.

12. The non-transitory storage medium of claim 9, wherein protecting the data on the source node at the recovery node includes performing data protection operations.

13. The non-transitory storage medium of claim 12, wherein the data protection operations including snapshot operations.

14. The non-transitory storage medium of claim 9, wherein the synchronization data comprises a synchronization snapshot.

15. The non-transitory storage medium of claim 9, wherein resuming normal operations includes generating incremental snapshots of the new source node that are transmitted to and applied at the recovery node.

16. The non-transitory storage medium of claim 9, further comprising enabling access to the recovery node before, during, and after migrating the source node to the target node, wherein the target node becomes the new source node.

* * * * *